United States Patent
Chen et al.

(10) Patent No.: US 6,933,726 B2
(45) Date of Patent: Aug. 23, 2005

(54) APPARATUS AND METHODS FOR REDUCING BOREHOLE CURRENT EFFECTS

(75) Inventors: Kuo-Chiang Chen, Sugar Land, TX (US); Robert C. Smith, Houston, TX (US); Gary A. Hazen, Houston, TX (US); Charles Kibbe, New Iberia, LA (US); Richard A. Rosthal, Houston, TX (US); Thomas D. Barber, Houston, TX (US); Stephen D. Bonner, Sugar Land, TX (US); David T. Oliver, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 190 days.

(21) Appl. No.: 10/604,622

(22) Filed: Aug. 5, 2003

(65) Prior Publication Data

US 2005/0030038 A1 Feb. 10, 2005

(51) Int. Cl.$^7$ ................................................ G01V 3/02
(52) U.S. Cl. ....................................... 324/339; 324/351
(58) Field of Search ................................. 324/332–333, 324/338–343, 346–348, 351–356, 366–370, 374–375

(56) References Cited

U.S. PATENT DOCUMENTS

| | | |
|---|---|---|
| 4,319,191 A | 3/1982 | Meador et al. |
| 4,651,101 A | 3/1987 | Barber et al. |
| 4,873,488 A | 10/1989 | Barber et al. |
| 5,041,975 A | 8/1991 | Minerbo et al. |
| 5,058,077 A | 10/1991 | Twist |
| 5,235,285 A | 8/1993 | Clark et al. |
| 5,359,324 A * | 10/1994 | Clark et al. ............. 340/854.3 |
| 5,508,616 A | 4/1996 | Sato et al. |
| 5,757,191 A | 5/1998 | Gianzero |
| 5,781,436 A | 7/1998 | Forgang et al. |
| 6,044,325 A | 3/2000 | Chakravarthy et al. |
| 6,084,052 A | 7/2000 | Aufdermarsh et al. |
| 6,147,496 A | 11/2000 | Strack et al. |
| 6,541,979 B2 | 4/2003 | Omeragic |
| 6,573,722 B2 | 6/2003 | Rosthal et al. |
| 6,667,620 B2 | 12/2003 | Homan et al. |

FOREIGN PATENT DOCUMENTS

GB 2 388 664 11/2003

* cited by examiner

*Primary Examiner*—Bot LeDynh
(74) *Attorney, Agent, or Firm*—Kevin P. McEnaney; Victor H. Segura; Brigitte L. Echols

(57) ABSTRACT

A well logging tool includes a conductive mandrel; an antenna array disposed around the conductive mandrel, wherein the antenna array comprises a plurality of antennas disposed on insulating supports and at least one contact spacer, the at least one contact spacer having at least one conductor channel having a contact assembly disposed therein; and a sleeve disposed over the antenna array, wherein the sleeve includes at least one electrode, the at least one electrode and the contact assembly adapted to provide a radially conductive path from an exterior of the well logging tool to the conductive mandrel.

12 Claims, 7 Drawing Sheets

FIG.1a
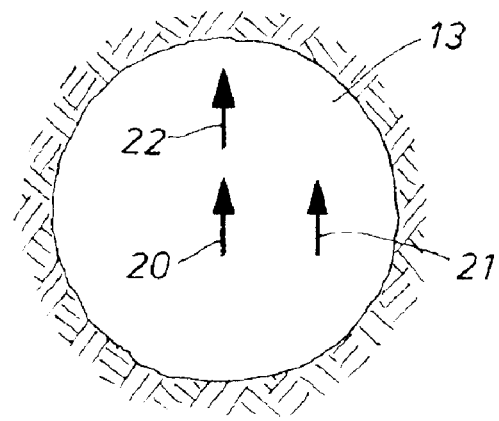
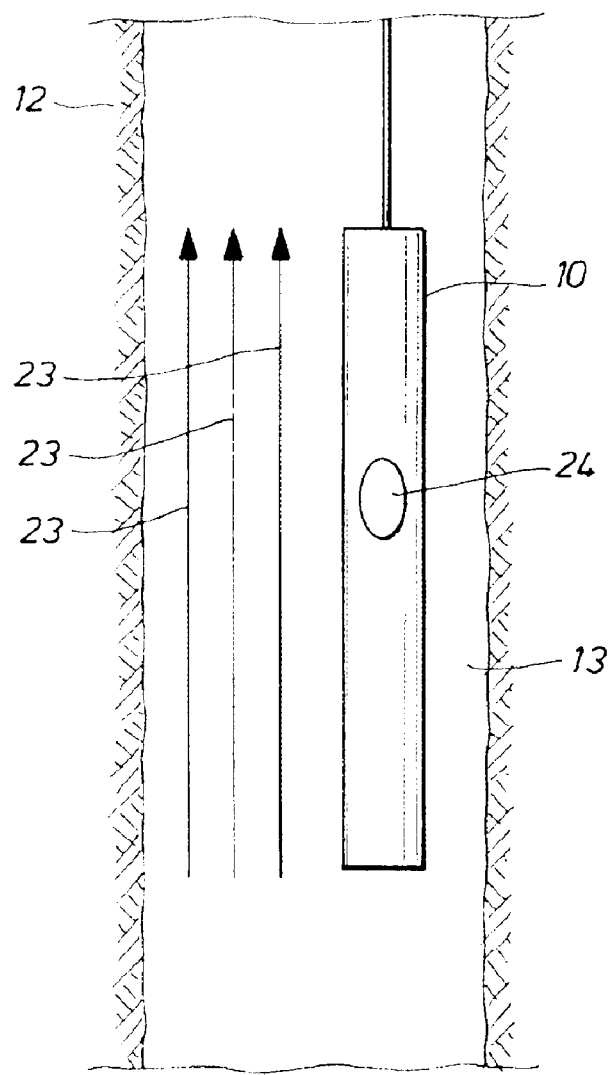
FIG.1b

APPARATUS AND METHODS FOR REDUCING BOREHOLE CURRENT EFFECTS

BACKGROUND OF INVENTION

The invention relates to apparatus and methods for reducing and/or correcting for borehole effects encountered in subsurface measurements.

BACKGROUND ART

Various resistivity logging techniques are known in the field of hydrocarbon exploration and production. These techniques, including galvanic (e.g., laterologs) and electromagnetic (EM) induction techniques, typically use logging instruments or "sondes" equipped with sources adapted to emit energy (voltage or EM field) through a borehole into the subsurface formation. The emitted energy interacts with the surrounding formation to produce signals that are detected by one or more sensors on the instrument. By processing the detected signals, a profile of the formation properties is obtained.

In order to obtain high-quality measurements, these tools (particularly, induction tools) need to remain approximately centered in the borehole. If an induction tool is not at the center of the borehole, it can induce large borehole-produced signals that interfere with signals from the formation. With both wireline and logging-while-drilling (LWD) or measurement-while-drilling (MWD) tools, it is difficult to keep the tools at the center of the borehole at all times. The change of signal as the measuring tool moves from the center of the borehole to the borehole wall is called "standoff effect" or "eccentering effect." If the tool is not at the center of the borehole, the measurements made at different azimuthal angles may not have the same standoff effects if the tools have directional sensitivity.

Standoff and eccentering affect different tools to different extents. For resistivity tools, these undesirable effects are due to the resistivity of the mud or due to the currents generated in the drilling mud in the borehole ("borehole currents"). Embodiments of the invention relate to methods for reducing any of these undesirable effects, particularly those arising from borehole currents. These methods are generally applicable to all types of resistivity logging. However, for clarity, the following description uses electromagnetic (EM) induction logging to highlight the problems associated with the borehole currents and to illustrate methods for minimizing these problems. One of ordinary skill in the art would appreciate that embodiments of the invention are not limited to EM induction logging tools and specifically include application on similar tools known as propagation tools, such as the commercially available Array Resistivity Compensated (ARC) tool by Schlumber Technology Corporation.

Electromagnetic (EM) induction logging techniques fall into two categories: wireline and logging-while-drilling (LWD). Wireline logging entails lowering an instrument into the borehole at the end of an electrical cable to obtain subsurface measurements. LWD techniques use instruments disposed on collars of a drilling assembly to make measurements while a borehole is being drilled.

Conventional wireline and LWD EM logging instruments are implemented with antennas that may function as sources and/or sensors. On wireline EM logging instruments, the antennas are typically enclosed by a housing constructed of a tough plastic (insulating) material, e.g., a laminated fiber-glass material impregnated with epoxy resin. On LWD EM logging instruments, the antennas are generally mounted on metallic supports (collars) in order to withstand the hash environments encountered during drilling. Alternatively, these instruments may be constructed of thermoplastic (insulating) materials. The thermoplastic material of these instruments provides a nonconductive structure for mounting the antennas. U.S. Pat. No. 6,084,052 (assigned to the present assignee) discloses composite-based logging instruments for use in wireline and LWD applications.

On both wireline and LWD instruments, the antennas are typically spaced apart from each other along the axis of the tool. These antennas are generally coils of the solenoid type that comprises one or more turns of insulated conductor wire wound around a support. U.S. Pat. Nos. 4,651,101, 4,873,488 and 5,235,285 (all assigned to the present assignee), for example, disclose instruments equipped with antennas disposed along a central metallic support.

In operation, the transmitter antenna is energized by an alternating current to emit EM energy through the borehole fluid (also referred to herein as mud) into the formation. The signals detected at the receiver antenna are usually expressed as a complex number (phasor voltage) and reflect interactions of the emitted energy with the mud and the formation.

A coil (or antenna) carrying a current can be represented as a magnetic dipole having a magnetic moment proportional to the current and the area. The direction and magnitude of the magnetic moment can be represented by a vector perpendicular to the plane of the coil. In conventional induction and propagation logging instruments, the transmitter and receiver antennas are mounted with their magnetic dipoles aligned with the longitudinal axis of the instruments. That is, these instruments have longitudinal magnetic dipoles (LMD). When an LWD tool is placed in a borehole and energized to transmit EM energy, the induced eddy currents flow in loops around the antenna in the borehole and in the surrounding formation. These eddy currents flow on planes that are perpendicular to the tool axis (hence, borehole axis). Therefore, no eddy current flows up or down the borehole.

An emerging technique in the field of EM induction well logging is the use of instruments incorporating antennas having tilted or transverse antennas, i.e., the magnetic dipoles of the antennas are tilted relative to or perpendicular to the tool axis. That is, these instruments have transverse or tilted magnetic dipoles (TMD). These TMD instruments can induce eddy currents that flow on planes not perpendicular to the borehole axis. Thus, the TMD tools can provide measurements that are sensitive to dipping planes, formation fractures, or formation anisotropy. Logging instruments equipped with TMDs are described, for example, in U.S. Pat. Nos. 4,319,191, 5,508,616, 5,757,191, 5,781,436, 6,044,325, and 6,147,496.

While the TMD tools are capable of providing improved formation resistivity measurements, these tools tend to be influenced more by borehole currents, particularly in high contrast situations, i.e., when the mud in the borehole is more conductive than the formation. When a TMD tool is energized at the center of a borehole (shown as 20 in FIG. 1a), it can induce eddy currents flowing up and down the borehole. However, due to the symmetry, the up and down currents cancel out and there is no net current flowing in the borehole. When a TMD tool is eccentered, the symmetry may disappear. If the TMD tool is eccentered in a direction parallel to the direction of the magnetic dipole of its antenna (shown as 22 in FIG. 1a), the symmetry with respect to the antenna is maintained and there is still no net current flowing along the borehole axis, when the antenna is energized. However, if a TMD is eccentered in a direction perpendicular to the direction of the magnetic dipole of its antenna (shown as 21 in FIG. 1a), the symmetry no longer exists and there will be net currents flowing up or down the borehole, when the antenna is energized. In high contrast situations (i.e., conductive mud and resistive formation), the borehole currents can flow a long distance along the borehole. When these currents pass TMD receivers, they induce undesired signals that can be many times larger than the signals from the formation.

Some of these undesirable effects may be attenuated during data processing. For example, U.S. Pat. No. 5,041,975 (assigned to the present assignee) discloses a technique for processing data from downhole measurements to correct for borehole effects. U.S. Pat. No. 5,058,077 discloses a technique for processing downhole sensor data to compensate for the effect of eccentric rotation on the sensor while drilling. U.S. Pat. No. 6,541,979 (assigned to the present assignee) discloses techniques for reducing the effect of borehole eccentricity, using mathematical corrections for the borehole currents effects.

Alternatively, the undesirable effects from borehole currents may be minimized during data acquisition. For example, U.S. Pat. No. 6,573,722 (assigned to the present assignee) discloses methods to minimize the borehole currents passing TMD antennas. This patent is hereby incorporated by reference. In one embodiment, an electrode located below the TMD antenna is hard-wired to another electrode located above the TMD antenna to provide a conductive path beneath the TMD antenna. This additional conductive path reduces the amount of borehole currents passing in front of the TMD antenna, and thus minimizes the undesirable effects. However, hardwiring is susceptible to current leakage or loss of electrical continuity due to the hash environments downhole (i.e., high temperature and high pressure). In another embodiment, a tool is disclosed that generates a localized current in the borehole (between the two electrodes located on either side of a TMD antenna) that counteracts or cancels out the undesirable borehole currents. However, the localized current itself has an adverse effect on the TMD antenna, albeit to a lesser extent than the borehole currents.

While these prior art methods and tools provide means to reduce the effects of borehole currents, there remains a need for further improvements in the development of simple and cost-effective methods and apparatus to reduce or eliminate the undesired effects of borehole currents.

SUMMARY OF INVENTION

In one aspect, embodiments of the invention relate to well logging tools having dynamic contacts that provide radial conductive paths to reduce or eliminate borehole currents passing a receiver antenna. A well logging tool in accordance with the invention includes a conductive mandrel; an antenna array disposed around the conductive mandrel, wherein the antenna array comprises a plurality of antennas disposed on insulating supports and at least one contact spacer, the at least one contact spacer having at least one conductor channel having a contact assembly disposed therein; and a sleeve disposed over the antenna array, wherein the sleeve includes at least one electrode, the at least one electrode and the contact assembly adapted to provide a radially conductive path from an exterior of the well logging tool to the conductive mandrel.

Another aspect of the invention relates to well logging tools having dynamic contacts that provide radial conductive paths to reduce or eliminate borehole currents passing a receiver antenna. A well logging tool in accordance with the invention includes a conductive mandrel; an antenna array disposed around the conductive mandrel, wherein the antenna array comprises a plurality of antennas disposed on insulating supports and at least one contact spacer comprising an electrically anisotropic material; and a sleeve disposed over the antenna array, wherein the sleeve includes at least one electrode, the at least one electrode and the at least one contact spacer adapted to provide a radially conductive path from an exterior of the well logging tool to the conductive mandrel.

Another aspect of the invention relates to methods for induction well logging using an induction logging tool disposed in a borehole, wherein the induction logging tool has an inner conductive mandrel, at least one antenna having a transverse magnetic dipole, and at least one radially conductive path linking the inner conductive mandrel to at least one electrode exposed on a surface of the induction logging tool, wherein the at least one radially conductive path comprising a contact assembly for providing dynamic contacts with the inner conductive mandrel and the at least on electrode. A method for resistivity logging including reduced borehole current effects in accordance with one embodiment of the invention includes transmitting an electromagnetic energy from a transmitter antenna on the induction logging tool into a formation; allowing currents in the borehole to flow through the at least one radially conductive path to the inner conductive mandrel; and measuring an induced signal in a receiver antenna on the induction logging tool.

Other aspects and advantages of the invention will be apparent from the following description and the appended claims.

BRIEF DESCRIPTION OF DRAWINGS

FIG. 1a illustrates parallel and perpendicular eccentering of an antenna on an electromagnetic logging tool within a borehole.

FIG. 1b illustrates induced borehole currents flowing in a borehole adjacent to a perpendicularly eccentered logging tool.

DETAILED DESCRIPTION

Figure 2:
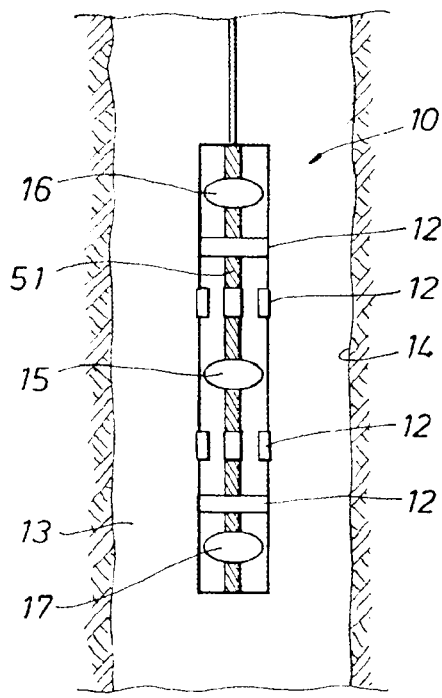
FIG. 2 illustrates a logging tool having various electrodes disposed in a borehole.

Embodiments of the invention relate to methods and apparatus for reducing or eliminating undesired effects caused by borehole currents. In some embodiments, apparatus of the invention provide reliable conductive paths to divert borehole currents away from a receiver on a resistivity tool. Embodiments of the invention can withstand the hash environments downhole.

As noted above, many of the undesirable effects are due to borehole currents that result from tool eccentering. FIG. 1a illustrates that a transverse or tilted magnetic dipole (TMD) 20, which is located at the center of the borehole, can be eccentered in a borehole 13 in two possible orientations. These two orientations are referred to as parallel eccentering 22 (parallel to the direction of the magnetic dipole of the antenna) and perpendicular eccentering 21. Parallel eccentering 22 produces eddy currents in the borehole. Due to the symmetry, no net current flows up or down the borehole. Thus, a tool at parallel eccentering 22 does not produce undesired effects more than a tool perfectly at the center of the borehole 20 does. In contrast, a tool at perpendicular eccentering 21 would induce eddy currents to flow up and down the borehole, but without the symmetry to cancel out the up and down currents. As a result, perpendicular eccentering 21 would give rise to significant borehole currents 23, as shown in FIG. 1b. The borehole currents 23 would produce a strong signal in a receiver 24 disposed on the resistivity instrument 10.

The perpendicular eccentering 21 and parallel eccentering 22 shown in FIG. 1a illustrate the extremes of tool displacements from the center of the borehole. In a typical case, the eccentering would likely lie between these two extremes.

The present invention offers a simple and cost-effective solution to the abovementioned problems arising from borehole currents. The apparatus and methods of the present invention reduce or eliminate borehole currents by providing radial conductive paths that route borehole currents through the inner mandrel of the tool, thus reducing the borehole currents passing by the receiver antenna.

FIG. 2 shows a well logging tool (or instrument) 10 having one or more antenna arrays according to one embodiment of the present invention. The well logging tool may be a wireline, LWD or measurement while drilling (MWD) type tool adapted for movement through the borehole. The tool may be an induction tool, where formation evaluation is based on voltage measurements, or a propagation tool, where formation evaluation is based on phase shift and attenuation measurements. A formation resistivity profile can be determined in real-time by sending the signal data to the surface as they are acquired, or it can be determined from a recorded-mode by recording the data on a suitable recordable medium (not shown) housed within the tool 10.

A stack of antenna arrays ("antenna array") is disposed around a conductive mandrel 51 in the well logging tool 10. Although the use of conductive mandrel was thought to be undesirable for induction logging tools, Barber et al. have shown that conductive mandrel (e.g., copper or stainless steel) can be used in induction logging tools to produce a more robust and strong tool. For details, see U.S. Pat. Nos. 4,651,101 and 4,873,488 issued to Barber et al. As shown in FIG. 2, the antenna array comprises a transmitter 15, an upper receiver 16 and a lower receiver 17. The transmitter 15 and the receivers 16 and 17 could be LMDs, TMDs, or a combination thereof. These transmitters and receivers are typically antennas disposed on nonconductive support members, and the antennas together with the support members are then disposed around the conductive mandrel. The antennas may be solenoid-type coil antennas, loop antennas, or any coil construction resulting in a transverse magnetic dipole.

The antenna array is disposed on the tool 10 inside an insulated sleeve (referred to as a "sleeve") 11. The sleeve 11 protects the antenna array. The sleeve 11 is sealingly attached to the tool 10, during the final stage of assembly, by sliding it over the tool 10 and positioning it adjacent to the stack of arrays. The sleeve 11 can be made of any durable insulating material that is typically used in the industry, for example, a composite material, elastomer or rubber.

As shown in FIG. 2, there is at least one pair of electrodes 12 embedded in the sleeve 11 such that the transmitter 15 is bracketed above and below by the pair of electrodes 12. The electrodes 12 are exposed to the borehole environment 13. The electrodes 12 could be singular (e.g., button) electrodes or annular (encircling the sleeve), for example, banded or ring electrodes. An embodiment that uses singular electrodes 12 may have multiple electrodes 12 azimuthally embedded in the same longitudinal position along the tool access. The electrodes 12 can be made of any durable conductive material that is typically used in the industry or that would be appreciated by one of ordinary skill in the art.

In a preferred embodiment, the sleeve 11 and the electrodes 12 are both made of durable materials in order to limit erosion (or wear) caused by rubbing against the borehole wall 14 or corrosion caused by the caustic nature of the borehole environment 13.

Because sleeve 11 is made of insulating materials, electrodes 12 of the prior art are linked by conductive wires between the upper and the lower electrodes 12 to create a conductive path behind the transmitter 15 (or receivers 16 and 17) such that currents would flow under the transmitter 15 (or receivers 16 and 17). However, such wire connections often fail in the harsh environments downhole, where the temperatures may reach 300° F. or higher and the pressures may be 20,000 psi or higher. The failure often results from the different thermal expansion coefficients of the various materials used on the tool.

Embodiments of the invention overcome these problems by using a flexible connections (dynamic contact) that can accommodate differential thermal expansion instead of direct hard wiring to form a conductive path between the electrodes and a conductive mandrel. Embodiments of the invention also take into account the fact that the sleeve 11 is slid over the stack of antennas when the tool assembly is complete. That is, the connection between the electrodes 12 on the sleeve 11 and the inner mandrel cannot be hard wired because the sleeve 11 is slid on last.

Figure 3:
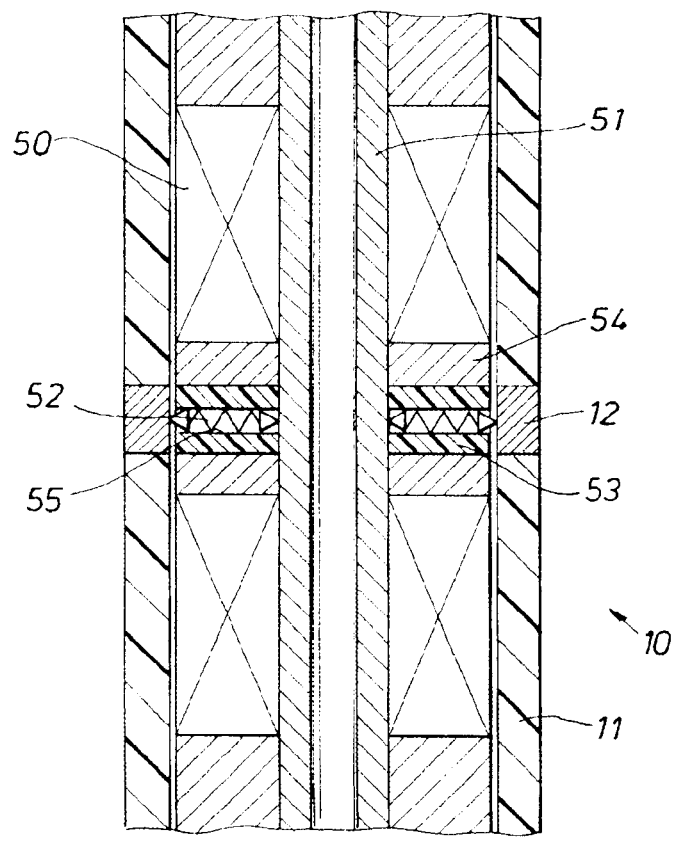
FIG. 3 illustrates an EM logging tool having dynamic contact electrodes according to one embodiment of the present invention.

FIG. 3 is a cross-section view of a portion of a fully assembled well logging tool 10, according to one embodiment of the present invention. As shown, the antenna array, which comprises spacers 54, bobbins 50, and contact spacers 53, is assembled on an inner mandrel 51 (which can be a conductive or metallic mandrel, a conductive wire, metal rod or post etc., and is referred to as a "conductive mandrel" herein). The insulating sleeve 11, with electrodes 12 embedded therein, covers and protects the antenna array. Also shown is an electrical contact assembly ("contact assembly") 52 disposed in a conductor channel 55 included in the contact spacer 53. The contact assembly 52 together with the electrodes 12 forms a conductive path from an exterior of the tool to the conductive mandrel 51. The contact assembly 52 as shown includes a spring. This is only for illustration. The "contact assembly" as used herein refers to a general structure that provides a conductive path from the electrode 12 to the conductive mandrel 51. The contact assembly may take any form, e.g., a conductor member, a conductor member plus two spring plates, a spring with two end plates, etc., as described in more detail below. In addition, the conductor member that comprises the contact assembly may be an integral part of the contact spacer 53, in some embodiments.

In preferred embodiments, the interface between the electrode 12 and the contact assembly 52 is not hardwired, nor is the interface between the contact assembly 52 and the conductive mandrel 51. This is because the sleeve 11, the antenna array, and the conductive mandrel 51 may exhibit different thermal expansion when the tool 10 is exposed to elevated temperatures. For example, the elongation of the antenna array, resulting from thermal expansion, may be the smallest because most of its component parts are made of non-conductive ceramics. On the other hand, the conductive mandrel 51 will expand substantially because metals typically have higher thermal expansion coefficients.

Therefore, in accordance with embodiments of the invention, the contact assembly 52 functions in a dynamic manner to maintain electrical continuity between the borehole environment (i.e., exterior of the tool), which is in contact with the electrode 12, and the conductive mandrel 51 when temperature varies. The number and the radial positioning of the contact assemblies 52 mirror the number and radial positioning of the electrodes 12. These conductive paths allow the currents to flow radially (from exterior of the tool into the axis of the tool) from the borehole environment into the conductive mandrel 51 and eliminate or minimize currents flowing along the borehole axis.

Figure 4:
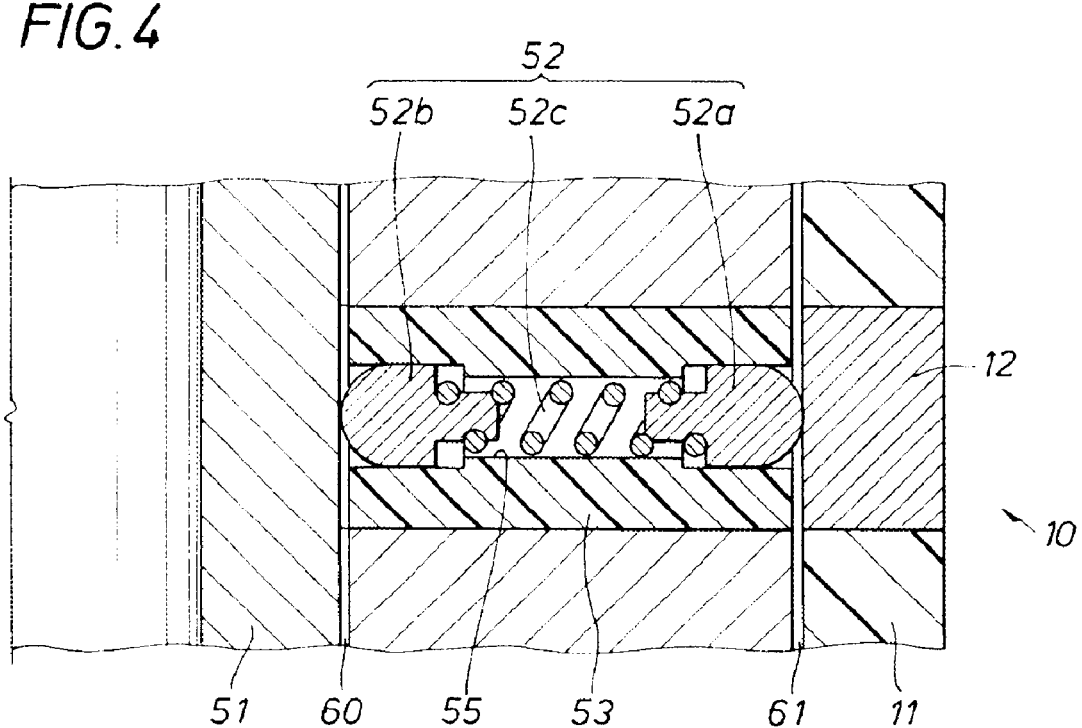
FIG. 4 illustrates an EM logging tool having dynamic contact electrodes according to another embodiment of the present invention.

FIG. 4 is a cross-section of a portion of a well logging tool 10, showing detailed view of a contact assembly 52 according to one embodiment of the present invention. As shown, the contact assembly 52 is a simple spring mounted contact device comprising an outer contact head 52a, an inner contact head 52b and a spring 52c. All of the parts of the contact assembly 52 preferably are made of conductive material. The contact assembly 52 is positioned inside a conductor channel 55 in the contact spacer 53, which is a component part of the antenna array and insulates the contact assembly 52 from other components in the antenna array. The spring 52c applies opposing force on the outer contact head 52a and the inner contact head 52b. The force applied should be sufficient to maintain an electrical contact between the outer contact head 52a and the electrode 12 across interface 61, regardless of movement caused by varying thermal expansion rates between the sleeve 11 and the antenna array. Likewise, this spring force maintains an electrical contact between the inner contact head 52b and the conductive mandrel 51 across interface 60, regardless of movement caused by varying thermal expansion rates between the conductive mandrel 51 and the antenna array.

The outer and inner contact heads 52a and 52b may be of any shape and size and may vary depending on specific tool design. The spring 52c may be attached to the outer and inner contact heads 52a and 52b in any fashion typically used in the industry. For example, the outer and inner contact heads 52a and 52b may have a reciprocal spiral profile to match the spiral shape of the spring 52c, with slight interference at the interface to ensure they will not detach. Alternatively, the interface between spring and contact heads can be soldered to ensure an even more reliable, but less flexible, connection.

Figure 5:
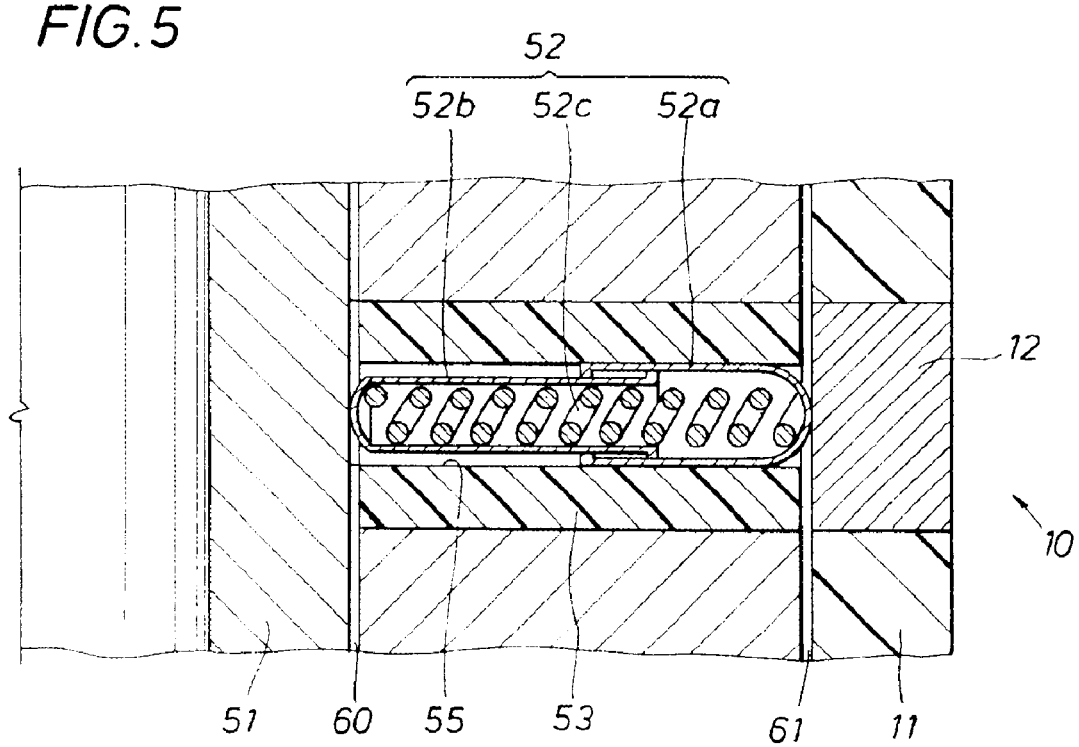
FIG. 5 illustrates an EM logging tool having dynamic contact electrodes according to one embodiment of the present invention.

FIG. 5 is a cross-section of a portion of a well logging tool 10 according to another embodiment of the present invention. As shown, the contact assembly 52 comprises a spring 52c housed inside the outer and inner contact heads 52a and 52b (which may be made of sheet metal or other appropriate conductive material molded in the form of a shell). The contact assembly 52 is disposed inside the conductor channel 55 in the contact spacer 53. The outer and inner contact heads 52a and 52b are connected in such a manner as to maintain electrical continuity. At the same time, the connection is adapted to allow the outer and inner contact heads 52a and 52b to slide apart, due to the force exerted by the spring 52c, and thus maintain contact with electrode 12 and the conductive mandrel 51.

Figure 6A:
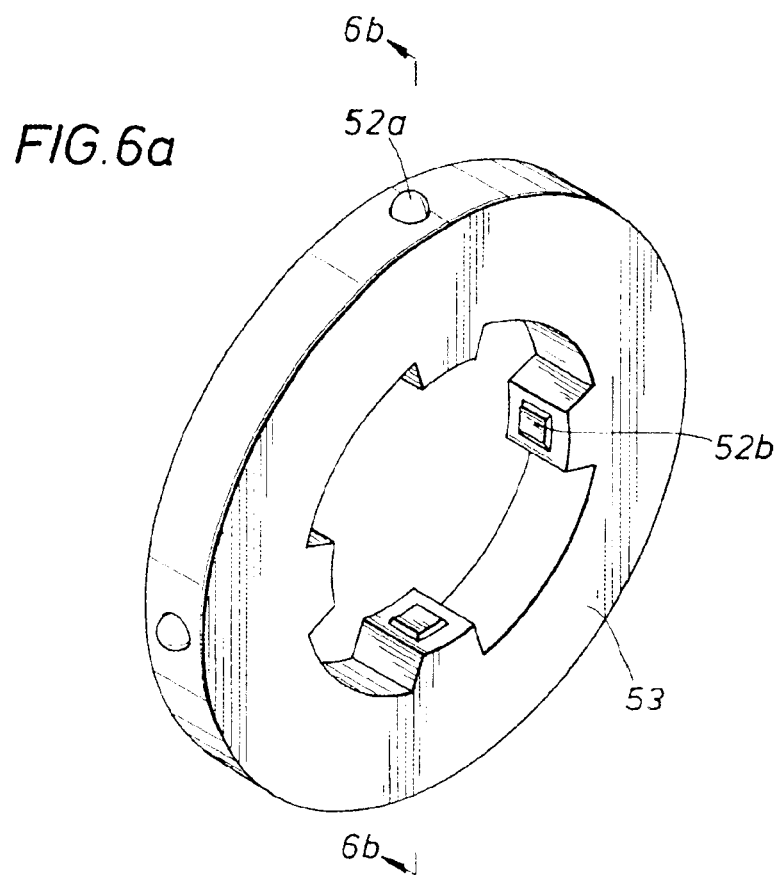
FIGS. 6a and 6b illustrate a contact spacer of an EM logging tool having dynamic contact electrodes according to one embodiment of the present invention.
Figure 6B:
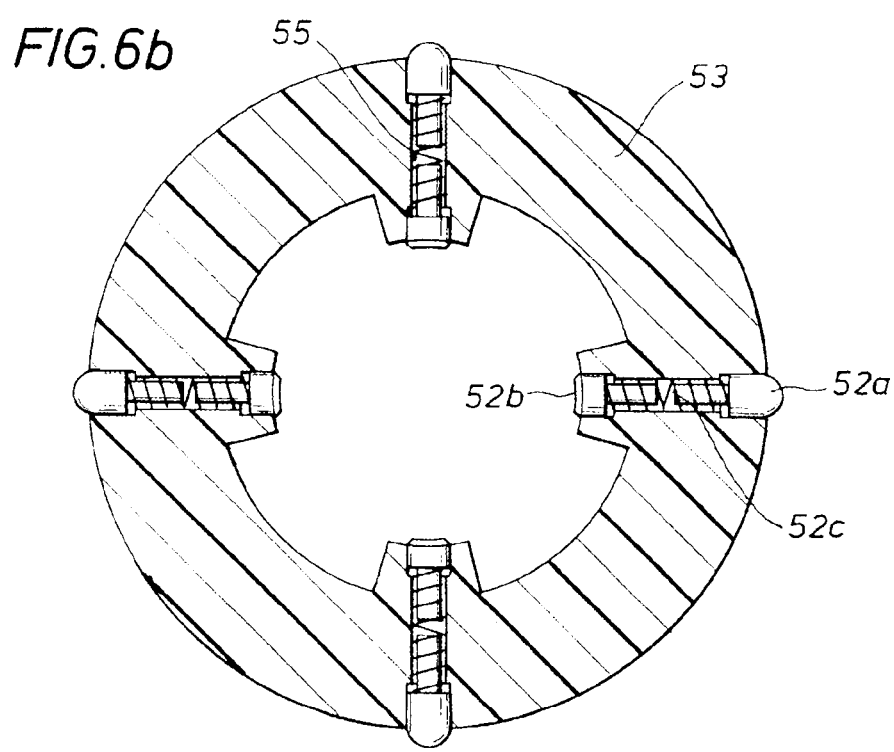

FIGS. 6a and 6b illustrate a contact spacer 53 including spring-mounted contact assemblies according to one embodiment of the present invention. The contact assembly 52 and contact spacer 53 are manufactured as a self-contained unit. The outer contact head 52a and the inner contact head 52b of the contact assembly protrude from the insulating contact spacer 53 so that they can contact the electrodes (shown as 12 in FIG. 3) and the conductive mandrel (shown as 51 in FIG. 3), respectively.

Figure 6C:
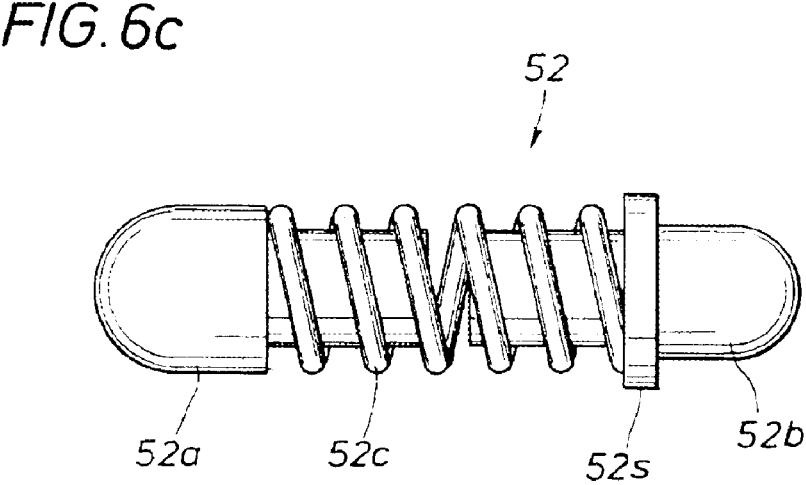
FIGS. 6c and 6d illustrate a variation of the contact spacer of an EM logging tool shown in FIGS. 6A and 6b.
Figure 6D:
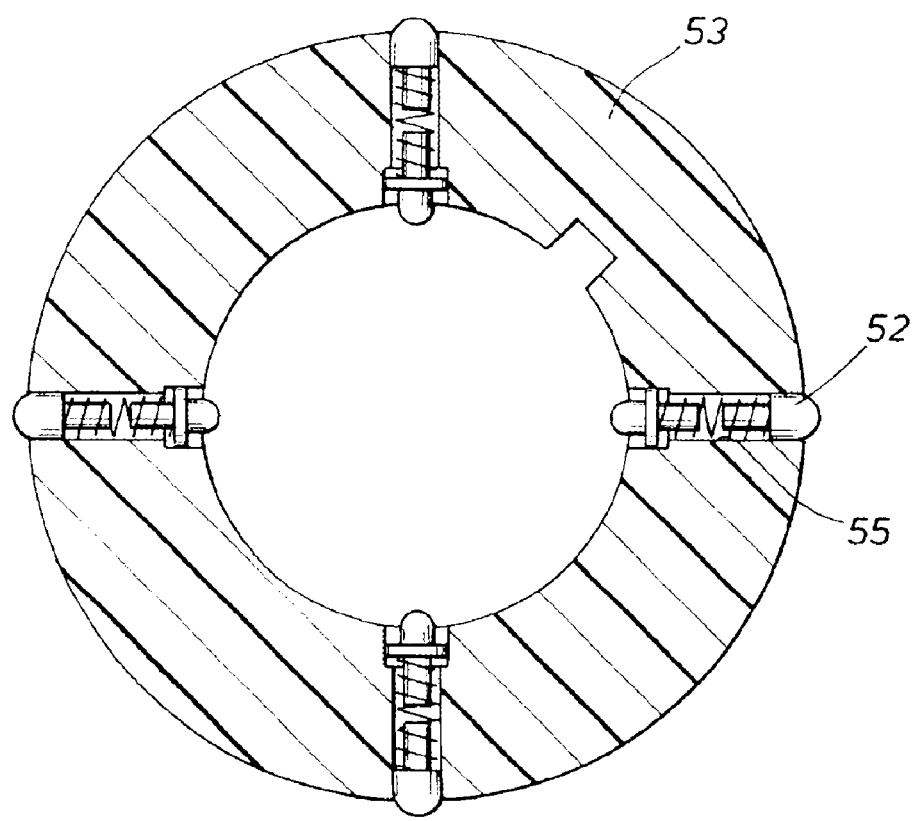

FIG. 6b is a cross-section of the contact spacer 53 shown in FIG. 6a. This view shows that the spring 52c, the outer contact head 52a, and the inner contact head 52b are radially positioned inside the conductor channel 55 in the contact spacer 53. As shown in FIG. 6b, the outer contact head 52a, and the inner contact head 52b have larger diameter than that of the spring 52c (the contact assembly has a dumbbell shape) such that the contact assembly would not slide off the conductor channel 55. One of ordinary skill in the art would appreciate that various modifications are possible without departing from the scope of the invention. For example, FIG. 6c shows a variation of a contact assembly 52 that has a shoulder 52s on the inner contact head. FIG. 6d shows that such contact assemblies 52 can be placed into conductor channels 55 in a contact spacer 53 from the inside of the contact spacer ring. Once the contact assemblies 52 are in place and the contact spacer 53 are slid on the mandrel (not shown), the contact assemblies 52 are prevented from sliding out of the conductor channels 55 by the mandrel.

Figure 7:
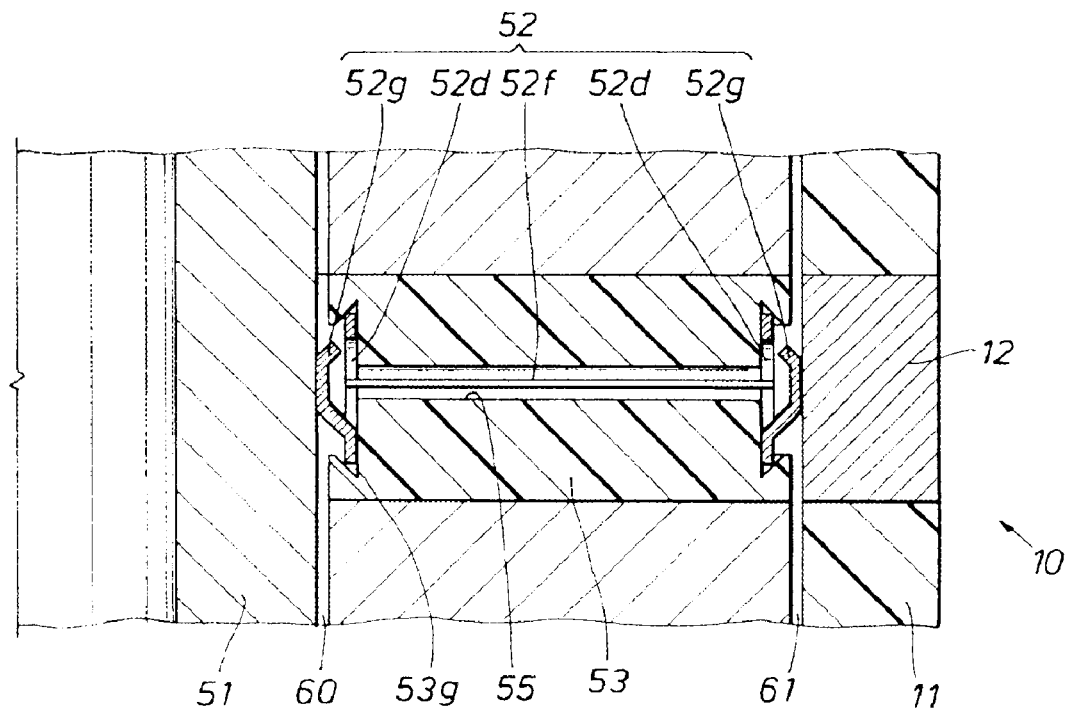
FIG. 7 illustrates an EM logging tool having dynamic contact electrodes according to another embodiment of the present invention.

The contact assemblies 52 shown in FIG. 3–6 use springs to provide dynamic contacts. One of ordinary skill in the art would appreciate that many modifications are possible without departing from the scope of the invention. For example, FIG. 7 shows a cross-section of a portion of a well logging tool 10 according to another embodiment of the present invention. As shown, the contact assembly 52 does not include a spring, but includes two spring plates 52d and 52e on both ends of a conductor member 52f. In this embodiment, the conductor member 52f is disposed inside the conductor channel 55 to provide the conductive path across the contact spacer 53. The dynamic contacts are provided by the outer contact spring plate 52d and an inner contact spring plate 52e. The spring plates 52d and 52e are made of conductive material typically used in the industry.

The outer and inner spring plates 52d and 52e each may be snapped into a dove-tail-groove 53a cut in the contact spacer 53. Alternatively, they may be fastened to the contact spacer 53 by other means, e.g., screws or bolts. The outer and inner spring plates 52d and 52e may include a bow-spring 52g to exert a force to maintain dynamic contacts with the electrode 12 and the conductive mandrel 51, respectively, regardless of movement caused by varying thermal expansion rates between the conductive mandrel 51, the antenna array, and the sleeve 11.

Figure 8:
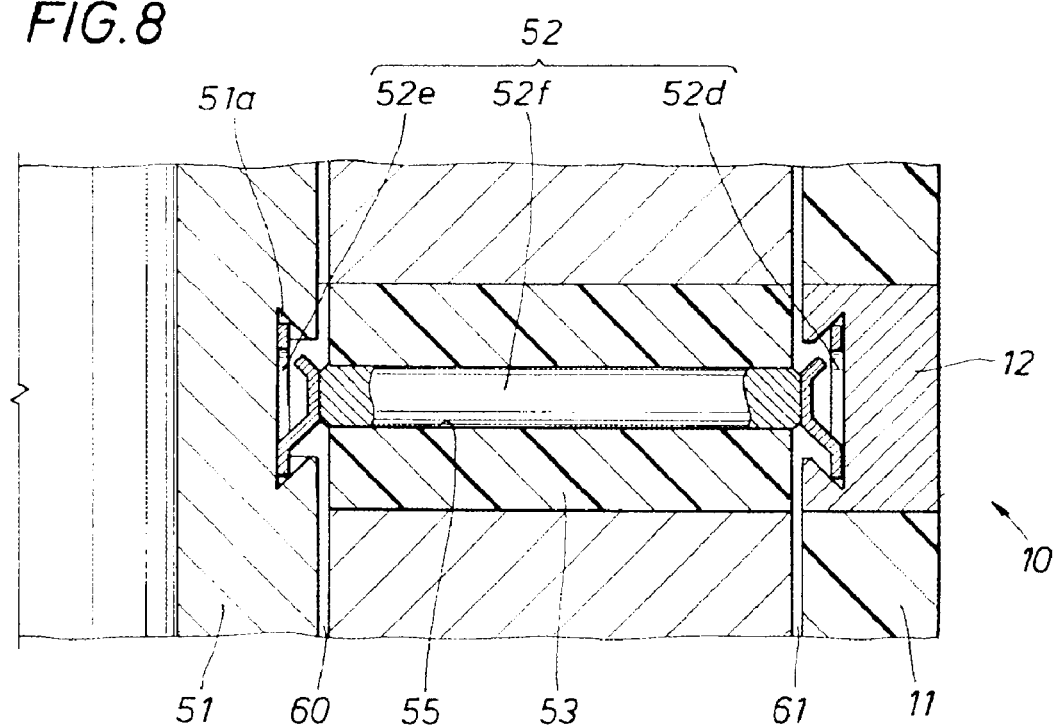
FIG. 8 illustrates an EM logging tool having dynamic contact electrodes according to another embodiment of the present invention.

FIG. 8 shows a cross-section of a variation of the contact assembly 52 shown in FIG. 7. As shown, the contact assembly 52 is mounted in the conductor channel 55, as in FIG. 7. However, the conductor member 52f may protrude at both ends from the conductor channel 55 in the contact spacer 53 in order to make contact with the outer and inner spring plates 52d and 52e. In this embodiment, the outer and inner spring plates 52d and 52e are snapped into dove-tail-grooves 12a and 51a, which are cut in the electrode 12 and the conductive mandrel 51, respectively, rather than in a contact spacer 53 shown in FIG. 7.

Figure 9:
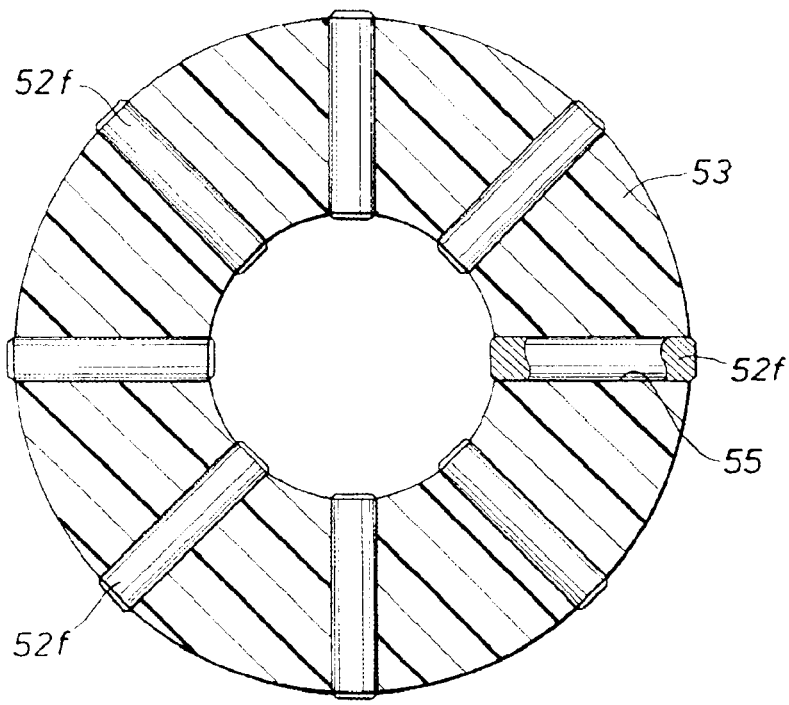
FIG. 9 illustrates a contact spacer of an EM logging tool having dynamic contact electrodes according to another embodiment of the present invention.

FIG. 9 is a cross-section view of the contact spacer shown in FIG. 8, illustrating a radial arrangement of conductor members 52f as they would be positioned inside the conductor channel 55 of the contact spacer 53.

As noted above, embodiments of the invention provide radial current paths from the borehole environment (exterior of the tool) to a conductive inner mandrel to reduce or eliminate borehole currents that otherwise would flow past a receiver. Radial paths are desirable because current flows in azimuthal direction (i.e., around the axis of the tool) would interfere with the measurements made at an LMD or a TMD receiver while longitudinal conductivity (along the axis of the tool) would interfere with the measurements made at a TMD receiver. According to one embodiment of the invention, elimination of azimuthal or longitudinal current flows may be accomplished by using an electrically anistotropic material for the construction of contact spacer 53. The anisotropic material would allow currents to flow radially, but not azimuthally or longitudinally. In these embodiments, the conductor member 52f and the conductor channel 55 shown in FIGS. 7–9 would be an integral part of the contact spacer 53. The dynamic contact may be provided by spring plates mounted on electrodes (12 in FIG. 7) and conductive mandrel (51 in FIG. 7), or on the contact spacer 53.

The above described are examples of embodiments in accordance with the invention. One of ordinary skill in the art would appreciate that other contact assemblies may be devised without departing from the scope of the invention. For example, in addition to springs or spring plates shown above, the contact assemblies may comprise other mechanical or hydraulic devices that exert forces on the end plates so that the contact assembly can maintain contacts with the electrodes on the sleeve and the conductive mandrel. Furthermore, although a plurality of electrodes 12 are shown in FIG. 3, in some embodiments, a single electrode 12 may suffice, for example, the neighboring parts on the tool assembly may include conductors that could provide current shunts to reduce or eliminate the borehole currents. As noted above, the description uses EM induction logging tools as examples. However, embodiments of the invention may also be applied to other resistivity logging tools.

Figure 10:
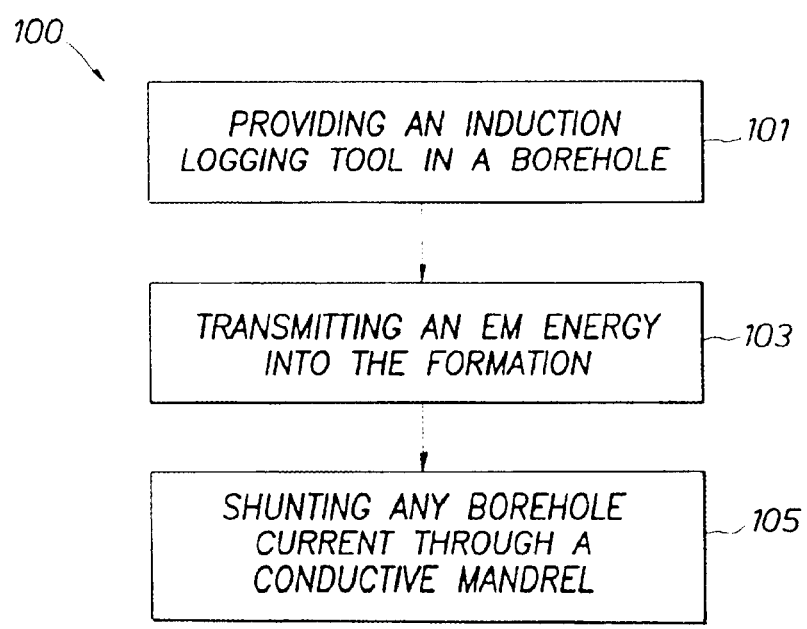
FIG. 10 illustrates a method for reducing borehole current effects using an EM logging tool having dynamic contact electrodes according to one embodiment of the present invention.

FIG. 10 illustrates a method 100 for reducing borehole current effects in accordance with embodiments of the invention. First, an induction logging tool or a propagation logging tool (e.g., 10 shown in FIG. 2) is disposed in a borehole (step 101). The logging tool has an inner conductive mandrel and at least one dynamic contact assembly linking the conductive mandrel to at least one electrode exposed on the outside surface of the tool body. The dynamic contact assembly and the exposed electrode provide a radially conductive path for currents to flow from borehole to the inner mandrel. In accordance with embodiments of the invention, either the contact between the contact assembly and the inner mandrel or the contact between the contact assembly and the electrode, or both, is not hardwired such that dynamic contacts can be maintained even in the presence of different thermal expansions of various parts in a logging tool.

The induction logging tool transmits EM energy into the formation (step 103). The EM energy may also induce borehole currents, depending on tool eccentering. If borehole currents are induced, radial conductive path on the tool shunts the borehole currents through the conductive inner mandrel (step 105). Thus, the radial conductive path reduces the magnitudes of borehole currents passing a receiver antenna.

Advantages of the invention include convenient and low-cost methods and apparatus for effectively eliminating borehole currents that may interfere with resistivity measurements. Apparatus in accordance with the invention provide efficient radial electrical paths from the borehole to the inner mandrel of a tool regardless of different thermal expansion coefficients of the various materials used in the tool.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A well logging tool, comprising:
   a conductive mandrel;
   an antenna array disposed around the conductive mandrel, wherein the antenna array comprises a plurality of antennas disposed on insulating supports and at least one contact spacer, the at least one contact spacer having at least one conductor channel having a contact assembly disposed therein; and
   a sleeve disposed over the antenna array, wherein the sleeve includes at least one electrode, the at least one electrode and the contact assembly adapted to provide a radially conductive path from an exterior of the well logging tool to the conductive mandrel.

2. The well logging tool of claim 1, wherein the contact assembly comprises a spring adapted to form dynamic contacts with the at least one electrode and the conductive mandrel.

3. The well logging tool of claim 1, wherein the contact assembly comprises a conductor member having spring plates attached to its ends, the spring plates adapted to form dynamic contacts with the at least one electrode and the conductive mandrel.

4. The well logging tool of claim 3, wherein the spring plates are each disposed in a dove-tailed groove on the contact spacer.

5. The well logging tool of claim 1, wherein the contact assembly comprises a conductor member and the at least one electrode and the conductive mandrel include spring plates adapted to form dynamic contacts with the conductor member.

6. A well logging tool of claim 5, wherein the conductor member is an integral part of the contact spacer.

7. A well logging tool of claim 1, wherein at least one of the plurality of antennas has a transverse magnetic dipole.

8. A well logging tool, comprising:
- a conductive mandrel;
- an antenna array disposed around the conductive mandrel, wherein the antenna array comprises a plurality of antennas disposed on insulating supports and at least one contact spacer comprising an electrically anisotropic material; and
- a sleeve disposed over the antenna array, wherein the sleeve includes at least one electrode, the at least one electrode and the at least one contact spacer adapted to provide a radially conductive path from an exterior of the well logging tool to the conductive mandrel.

9. A well logging tool of claim 8, wherein the at least one electrode and the conductive mandrel include spring plates adapted to form dynamic contacts with the at least one contact spacer.

10. A well logging tool of claim 8, wherein the contact spacer includes spring plates adapted to form dynamic contacts with the at lest one electrode and the conductive mandrel.

11. A well logging tool of claim 8, wherein at least one of the plurality of antennas has a transverse magnetic dipole.

12. A method for resistivity logging including reduced borehole current effects using a logging tool disposed in a borehole, wherein the logging tool having an inner conductive mandrel, at least one antenna having a transverse magnetic dipole, and at least one radially conductive path linking the inner conductive mandrel to at least one electrode exposed on a surface of the induction logging tool, wherein the at least one radially conductive path comprising a contact assembly for providing dynamic contacts with the inner conductive mandrel and the at least on electrode, the method comprising:
- transmitting an electromagnetic energy from a transmitter antenna on the logging tool into a formation;
- allowing currents in the borehole to flow through the at least one radially conductive path to the inner conductive mandrel; and
- measuring an induced signal in a receiver antenna on the logging tool.

* * * * *